(12) United States Patent
Chamberot

(10) Patent No.: US 9,454,663 B2
(45) Date of Patent: Sep. 27, 2016

(54) DATA PROCESSING METHOD AND DEVICE

(71) Applicant: OBERTHUR TECHNOLOGIES, Colombes (FR)

(72) Inventor: Francis Chamberot, Vanves (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 13/845,914

(22) Filed: Mar. 18, 2013

(65) Prior Publication Data

US 2013/0219522 A1 Aug. 22, 2013

Related U.S. Application Data

(62) Division of application No. 11/660,218, filed as application No. PCT/FR2005/002083 on Aug. 12, 2005.

(30) Foreign Application Priority Data

Aug. 17, 2004 (FR) ...................................... 04 08928

(51) Int. Cl.
*G06F 11/30* (2006.01)
*G06F 21/60* (2013.01)
*G06F 21/55* (2013.01)
*G06F 12/14* (2006.01)

(52) U.S. Cl.
CPC ............. *G06F 21/60* (2013.01); *G06F 21/552* (2013.01)

(58) Field of Classification Search
CPC ............................ G06F 21/60; G06F 21/552
USPC ...................................................... 713/194
See application file for complete search history.

(56) References Cited

U.S. PATENT DOCUMENTS

| | | |
|---|---|---|
| 5,274,817 A | 12/1993 | Stahl |
| 5,367,149 A | 11/1994 | Takahira |
| 6,000,004 A | 12/1999 | Fukumoto |
| 6,141,771 A * | 10/2000 | O'Brien et al. ................. 714/15 |
| 6,223,290 B1 | 4/2001 | Larsen et al. |
| 6,510,521 B1 | 1/2003 | Albrecht et al. |
| 6,567,539 B1 * | 5/2003 | Benezeth ...................... 382/124 |
| 6,738,749 B1 | 5/2004 | Chasko |
| 6,745,370 B1 * | 6/2004 | Segal ..................... G11C 29/72 257/E21.526 |
| 6,820,047 B1 | 11/2004 | Aizawa et al. |
| 7,036,739 B1 | 5/2006 | Mann et al. |
| 7,043,615 B1 | 5/2006 | Kobayashi et al. |
| 7,057,937 B1 | 6/2006 | Matsubara et al. |

(Continued)

FOREIGN PATENT DOCUMENTS

| JP | 6076135 | 3/1994 |
|---|---|---|
| JP | 10134586 | 5/1998 |

(Continued)

*Primary Examiner* — Linglan Edwards
*Assistant Examiner* — Gary Gracia
(74) *Attorney, Agent, or Firm* — Young & Thompson

(57) ABSTRACT

A data processing method pertains to a step (E308) including in verifying a criterion indicative of the normal running of the method and a step (E320) including in processing performed in case of negative verification. The processing step (E230) is separated from the verifying step (E308) by an intermediate step (E312, E314) of non-null duration. The intermediate step (E312, E314) and/or the processing step (E320) includes at least one action (E314) performed in case of positive verification. The invention also concerns a corresponding device.

20 Claims, 4 Drawing Sheets

(56) References Cited

U.S. PATENT DOCUMENTS

| | | |
|---|---|---|
| 7,058,819 B2 | 6/2006 | Okaue |
| 7,073,073 B1 | 7/2006 | Nonaka et al. |
| 7,149,946 B2 | 12/2006 | Peretz et al. |
| 7,216,270 B1 * | 5/2007 | Jacobson ............... G11C 29/44 714/718 |
| 7,284,111 B1 * | 10/2007 | Sae-Koe ............. H04L 12/5693 370/254 |
| 7,349,884 B1 | 3/2008 | Odom et al. |
| 2001/0010602 A1 | 8/2001 | Takahashi |
| 2002/0018384 A1 | 2/2002 | Sumitani et al. |
| 2002/0035658 A1 * | 3/2002 | Whetsel ....................... 710/300 |
| 2002/0106084 A1 | 8/2002 | Azuma et al. |
| 2002/0108036 A1 | 8/2002 | Okaue |
| 2002/0151992 A1 | 10/2002 | Hoffberg et al. |
| 2003/0028784 A1 | 2/2003 | Uchida |
| 2003/0028794 A1 | 2/2003 | Miller |
| 2003/0065828 A1 | 4/2003 | Danan |
| 2003/0097344 A1 | 5/2003 | Chaum et al. |
| 2003/0101351 A1 | 5/2003 | Liardet |
| 2003/0112665 A1 | 6/2003 | Okamoto |
| 2003/0188117 A1 | 10/2003 | Yoshino et al. |
| 2003/0194086 A1 * | 10/2003 | Lambert ................. G06F 7/725 380/44 |
| 2003/0222797 A1 | 12/2003 | Futa et al. |
| 2004/0003321 A1 | 1/2004 | Glew et al. |
| 2004/0030905 A1 | 2/2004 | Chow et al. |
| 2004/0049637 A1 * | 3/2004 | Morikawa ..................... 711/133 |
| 2004/0061500 A1 * | 4/2004 | Lou et al. ..................... 324/332 |
| 2004/0078588 A1 * | 4/2004 | Chow ............. G06K 19/07363 726/36 |
| 2004/0088064 A1 | 5/2004 | Endo |
| 2004/0103177 A1 | 5/2004 | Ben Ismail et al. |
| 2004/0133794 A1 * | 7/2004 | Kocher et al. ................ 713/193 |
| 2004/0136421 A1 | 7/2004 | Robinson et al. |
| 2004/0141439 A1 * | 7/2004 | Suzuki et al. ............. 369/47.34 |
| 2004/0151026 A1 | 8/2004 | Naso et al. |
| 2004/0153626 A1 | 8/2004 | Saito |
| 2004/0172538 A1 | 9/2004 | Satoh et al. |
| 2004/0172576 A1 | 9/2004 | Yoshii et al. |
| 2004/0186779 A1 * | 9/2004 | Yamamichi et al. ............ 705/14 |
| 2004/0199743 A1 | 10/2004 | Loaiza et al. |
| 2004/0204800 A1 | 10/2004 | Honda |
| 2004/0215909 A1 | 10/2004 | Imai et al. |
| 2004/0225776 A1 * | 11/2004 | DiRaimondo et al. ....... 710/200 |
| 2004/0240097 A1 | 12/2004 | Evans |
| 2004/0243766 A1 | 12/2004 | Lovelace |
| 2004/0260593 A1 | 12/2004 | Abraham-Fuchs et al. |
| 2004/0264023 A1 | 12/2004 | Kimura et al. |
| 2004/0268312 A1 | 12/2004 | Abe et al. |
| 2005/0021427 A1 | 1/2005 | Takahashi et al. |
| 2005/0021990 A1 | 1/2005 | Liardet et al. |
| 2005/0073885 A1 | 4/2005 | Suzuki et al. |
| 2005/0154672 A1 | 7/2005 | Griffin et al. |
| 2005/0157563 A1 | 7/2005 | Lin et al. |
| 2005/0271202 A1 * | 12/2005 | Shu ...................... G06F 9/3001 380/29 |
| 2006/0020810 A1 | 1/2006 | Waltermann |
| 2006/0029220 A1 * | 2/2006 | Ibrahim ................. G06F 7/725 380/28 |
| 2006/0031676 A1 | 2/2006 | Vantalon et al. |

FOREIGN PATENT DOCUMENTS

| | | |
|---|---|---|
| JP | 2003204322 | 7/2003 |
| JP | 2003228521 | 8/2003 |
| WO | 9935621 | 7/1999 |
| WO | 0195115 | 12/2001 |

* cited by examiner

DATA PROCESSING METHOD AND DEVICE

BACKGROUND OF THE INVENTION

The present invention concerns a method of processing data, used for example in a microcircuit card.

In certain contexts, one seeks to render secure the operation of data processing apparatus. This is in particular the case in the field of monetics, in which an electronic entity (for example microcircuit card) carries information representing a pecuniary value and which can therefore be modified only in accordance with a particular protocol. It may equally be a question of an electronic entity for identifying its carrier, in which case operation must be rendered secure to prevent any falsification or abusive use.

One such electronic entity is for example a bank card, a telephone SIM card (the acronym SIM stemming from the English Subscriber Identity Module), an electronic passport, a secure module of the HSM type (from the English Hardware Security Module) such as a PCMCIA card of the IBM4758 type, without these examples being limiting.

In order to make operation more secure, one seeks to be protected against the various types of attack that may be envisaged. One large category of attacks to be combated consists of attacks known as fault generation attacks, during which malicious persons seek to cause the data processing apparatus to depart from its normal, and thus secure, operation.

To parry this kind of attack, the data processing methods commonly used provide steps for verification of the normal running of the method, with the aim of detecting anomalies one possible origin whereof is a fault generation attack. If an anomaly is detected (i.e. if normal running is not verified), the anomaly is processed immediately, and this is generally called security processing. This type of processing consists in fact in a countermeasure intended to combat the attack, for example by prohibiting all subsequent operation of the data processing apparatus.

As indicated, the processing of the anomaly is usually thought of as following on immediately from detection, since the fact of continuing the processing in the presence of an anomaly clearly entails the risk of further degrading the operation of the data processing apparatus and therefore its security.

However, the inventor has noted that this ordinary thinking gives the attacker information as to the moment at which the anomaly is detected. In fact, the time of detection of the anomaly is in itself difficult to access from outside. It is nevertheless thought that the attacker, by observing and analyzing the electrical consumption (or the electromagnetic radiation) of the apparatus, can obtain access to the time of implementation of the processing of the anomaly, for example in the case where this processing consists in an action on an external device. Since according to the ordinary thinking this processing follows on immediately from the detection of the anomaly, the attacker could deduce relatively easily from this the time of detection of the anomaly.

Accordingly, because of the proximity of the detection of the anomaly and of the processing thereof in the usual systems, the attacker has access to additional information on the operation of the data processing apparatus, which of course compromises making the method secure.

SUMMARY OF THE INVENTION

In order in particular to avoid this problem, and consequently to improve further the security of the data processing methods, the invention proposes a data processing method comprising a step of verification of a criterion indicative of the normal running of the method and a processing step effected in the case of negative verification, wherein the processing step is separated from the verification step by an intermediate step of non-null duration.

A first action being effected in the case of positive verification, the intermediate step entails effecting at least one second action having at least one first characteristic in common with the first action.

An attacker seeking to understand the operation of the method will therefore have difficulties in distinguishing normal operation (positive verification) from operation in the case of an anomaly (i.e. negative verification).

The second action is different from the first action, for example. Thus the second action may comprise fewer risks, or even no risk, to the security of the system.

If a third action is effected in the case of positive verification, the processing step may entail effecting at least one fourth action having at least one second characteristic in common with the third action.

Thus an attacker will not be able to distinguish between the modes of operation. He will therefore not be able to prevent the processing of the anomaly.

If the method is implemented in electronic apparatus, the first or second common characteristic is for example the electrical consumption or the electromagnetic radiation of the apparatus generated by the first, respectively the third, action and by the second, respectively the fourth, action. Thus an attacker will not be able to distinguish the normal mode of operation from the abnormal mode of operation by observation of the electrical and/or electromagnetic behavior of the electronic apparatus.

The first or second common characteristic may equally be the number of instructions used in the first, respectively the third, action and in the second, respectively the fourth, action, which makes it impossible to distinguish between the modes of operation by the duration of said actions.

The first or second common characteristic may further be the type of instruction used by the first, respectively the third, action and by the second, respectively the fourth, action, which ensures great similarity in the electrical and/or electromagnetic signature of said actions.

The first or second common characteristic may also be the type of data processed by the first, respectively the third, action and by the second, respectively the fourth, action, which also ensures such similarity.

If the first, respectively the third, action entails access to a first area of a memory, the second, respectively the fourth, action may entail access to a second area of said memory different from the first area. The processing of the data therefore appears similar in both the modes of operation mentioned above although it is in fact effected in different contexts.

According to another possibility, the first or second common characteristic is communication with an external device, which may be for example a cryptoprocessor, a memory (e.g. a rewritable semiconductor memory), or a user terminal. Communication with such external devices is in fact observed by attackers and this common characteristic is therefore particularly likely to lead them into error.

The first action may entail a secure step, for example a cryptographic algorithm, which is thus protected against fault generation attacks.

The processing step entails for example writing blocking data into a physical memory.

According to a particularly interesting possibility, the writing of blocking data may be effected in accordance with a chronology identical to writing data into the physical memory in the case of normal running of the method.

In one embodiment, this data represents a pecuniary value. Thus an attacker will not be able to distinguish a priori between blocking of the apparatus and an operation on the value that it represents.

The criterion is negative for example if an erroneous signature is provided or if an anomaly is detected.

The criterion may also be negative if an attack is detected. As has been stated, the invention is of particular interest in this context.

The criterion may equally be negative if a functional error is detected. Such processing in the case of functional error is unusual but proves interesting for enhancing the security of the system, in particular because such functional errors are very rare outside attack situations and thus reflect the probable presence of an attack.

According to one possible feature, the intermediate step entails at least one instruction determined during the execution of the method, for example randomly. The understanding of the operation of the system by the attacker is further complicated by this.

According to one possible embodiment, a microcircuit card comprises a microprocessor and the method is executed by the microprocessor.

The invention also proposes a data processing device comprising means for verification of a criterion indicative of the normal operation of the device and processing means used in the case of negative verification characterized by separation means for separating the operation of the verification means from the operation of the processing means by a non-null duration.

According to one implementation possibility, first action means are used in the case of positive verification and the separation means have at least one first characteristic in common with the first action means.

According to another implementation possibility, second action means are used in the case of positive verification and the processing means have at least one second characteristic in common with the second action means.

This device is for example a microcircuit card.

The invention further proposes, in a manner that is novel in itself, a method of processing data comprising a step of verification of a criterion indicative of the normal running of the method and a processing step effected in the case of negative verification, characterized in that, a first action being effected in the case of positive verification, the processing step entails effecting at least one second action having a characteristic in common with the first action.

In this context, there may be provision for the second action to take place with a chronology identical to the first action in the case of normal running of the method.

Here the first action is for example writing data into a physical memory and the second action is for example writing blocking data into that physical memory.

This method may moreover have the characteristics associated with the method proposed hereinabove and the advantages that flow therefrom. Moreover, a device which comprises means for implementing the various steps of this method is proposed in the same line of thinking.

BRIEF DESCRIPTION OF THE DRAWINGS

Other characteristics and advantages of the present invention will become more apparent on reading the following description, given with reference to the appended drawings, in which.

DESCRIPTION OF PREFERRED EMBODIMENTS

Figure 1:
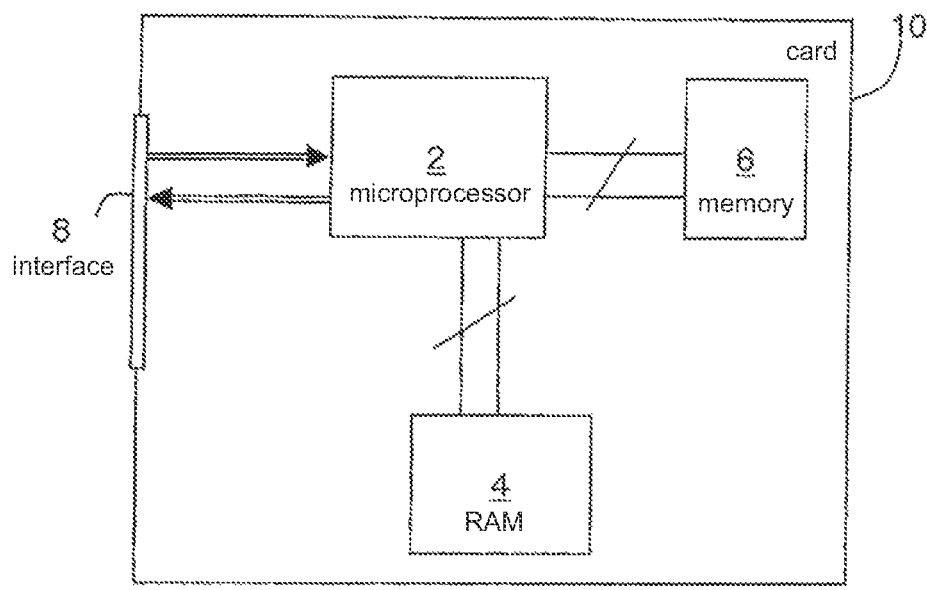
FIG. 1 represents diagrammatically the main elements of one possible embodiment of a microcircuit card.

The microcircuit card 10 the principal elements whereof are represented in FIG. 1 includes a microprocessor 2 connected on the one hand to a random access memory (or RAM from the English Random Access Memory) 4 and on the other hand to a rewritable semiconductor memory 6, for example a read-only memory that can be erased and programmed electrically (or EEPROM from the English Electrically Erasable Programmable Read Only Memory). Alternatively, the rewritable semiconductor memory 6 could be a flash memory.

The memories 4, 6 are each connected to the microprocessor 2 by a bus in FIG. 1; alternatively, there could be one common bus.

The microcircuit card 10 also includes an interface 8 for communication with a user terminal that here takes the form of contacts one of which provides a bidirectional link with the microprocessor 2, for example. The interface thus enables bidirectional communication to be set up between the microprocessor 2 and the user terminal into which the microcircuit card 10 will be inserted.

Thus, on insertion of the microcircuit card 10 into a user terminal, the microprocessor 2 executes a method of operation of the microcircuit card 10 in accordance with a set of instructions stored for example in a read-only memory (or ROM from the English Read-Only Memory)—not shown— or in the rewritable memory 6, which defines a computer program. This method generally includes the exchange of data with the user terminal via the interface 8 and the processing of data within the microcircuit card 10, and precisely within the microprocessor 2, possibly using data stored in the rewritable memory 6 and data stored temporarily in the random access memory 4.

Examples of such methods that use the invention are given hereinafter with reference to FIGS. 3 to 5.

Figure 2:
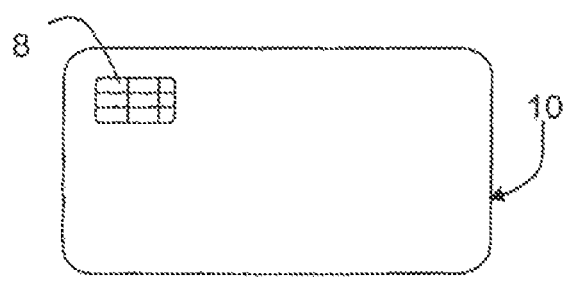
FIG. 2 represents the general physical appearance of the microcircuit card from FIG. 1.

FIG. 2 represents the general physical appearance of the microcircuit card 10 produced with the general shape of a rectangular parallelepiped of very small thickness.

The communication interface 8 provided with the contacts already mentioned is clearly apparent on the face of the microcircuit card 10 visible in FIG. 2, in the form of a rectangle inscribed within the upper face of the microcircuit card 10.

Figure 3:
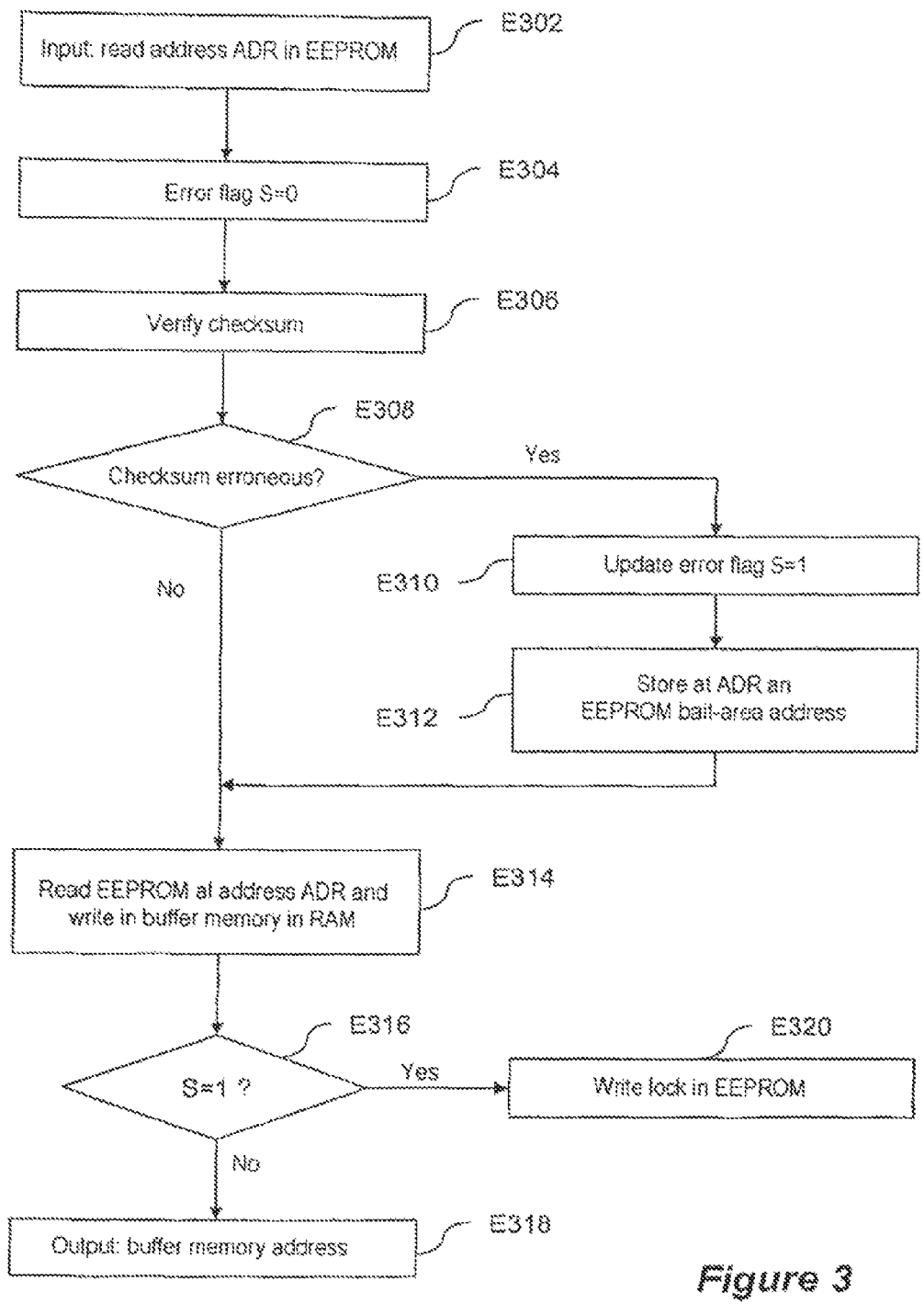
FIG. 3 represents a method implemented in accordance with a first embodiment of the invention.

FIG. 3 represents a method of reading in the rewritable memory 6 such as may be used by the microcircuit card 10 shown in FIG. 1, for example thanks to the execution of a computer program within the microprocessor 2. This method is given as a first example of use of the invention.

Such a method is used for example if the data written in the rewritable memory (or EEPROM) 6 must be used by the microprocessor 2 during a data processing operation; the data written in rewritable memory 6 is read beforehand in order to be transferred into the random access memory 4 in which it can be easily manipulated.

As represented in the step E302 of FIG. 3, the method receives as input the address ADR at which it must effect the read operation in the rewritable memory (or EEPROM) 6.

In the step E304, the method initializes to the value 0 an error flag S.

The variables being correctly initialized, there follow verification steps dedicated to ensuring safe operation of the system as is generally required in the secure contexts of use of microcircuit cards.

Thus the step E306 proceeds to the verification of a checksum. Naturally, other verifications are possible but have not been represented in FIG. 3 to clarify the explanation of the invention.

The step E306 of verification of a checksum consists in verifying that the data written in rewritable memory 6 is consistent with the checksum (sometimes designated by the Anglo-Saxon terminology "checksum") associated with that data.

There is then an alternative in the step E308: if the checksum is not erroneous, i.e. the verification of the checksum is positive, normal operation continues with the step E314 described hereinafter; if on the other hand an error is detected in the checksum, i.e. the step of verification of the checksum gives a negative result, there follows the step E310.

It may be noted that the presence of an erroneous checksum, although it indicates in all cases abnormal operation of the microcircuit card, may have diverse origins: it may be a question of a functional error (for example an error in the content of the rewritable memory 6), but it may equally be a question of the trace of a fault generation attack.

In the step E310, the error flag S is updated to the value 1 to indicate that an anomaly has been detected.

There then follows the step E312 in which the read address ADR received as input to the method (see the step E302 described hereinabove) is replaced by the address of a "bait-area" situated in the rewritable memory 6. The bait-area is a memory area a priori different from the address received in the step E302; it is for example an address at which no reading should normally be effected in normal operation (i.e. during the normal and anomaly-free operation of the microcircuit card).

By way of example, these bait-areas may include data determined randomly and/or data of the same structure as the data that was initially to be read at the address ADR received in the step E302.

Note that the step E312 that has just been described does not constitute a step of processing of the anomaly detected in the step E308: for example, it is not a question of the transmission of a code relating to the detected anomaly, the display of a message relating to that anomaly, or a countermeasure when it is considered that the anomaly stems from a fault generation attack.

After the step E312 (effected like the step E310 only in the case of abnormal operation of the microcircuit card, i.e. in the case of negative verification of normal operation in the step E306), there follows the step E314 which, as indicated hereinabove, forms part of the normal operation of the microcircuit card (in the case of positive verification of the checksum as indicated with regard to the step E308).

The step E314 consists in transferring the data from the rewritable memory 6 to the random access memory 4 and therefore constitutes in this regard the core of the FIG. 3 method, following the initialization and verification steps.

Precisely, the step E314 reads in the rewritable memory 6 at the address specified by the variable ADR previously mentioned and writes the data it has read in random access memory 4 in an area usually referred to as buffer memory that is generally used to manipulate data.

It may be noted that, if the checksum has been verified positively in the preceding steps, the variable ADR actually points to the address in rewritable memory 6 received as input, i.e. to the data that must actually be read. On the other hand, if an erroneous checksum has been detected (i.e. the verification was negative in the preceding steps), the variable ADR points to the bait-area defined in the step E312 with the result that the step E314 will in fact transfer data from the bait-area into the buffer memory area in random access memory 4, and not effect the reading operation required by the address received in the step E302.

Accordingly, if an operating anomaly is detected by the negative verification of the step E306, no access is effected to the rewritable memory 6 at the address provided in normal operation, at which is generally stored data that is relatively sensitive from the security point of view. This gives protection against an attacker finding out this sensitive data if the origin of the detected anomaly is a fault generation attack.

Furthermore, the step E314 being effected in normal operation as after detection of an operating anomaly (although with different data), it is virtually impossible for an attacker to detect a departure from normal operation, for example by current measurements.

After the step E314, the method proceeds to the step E316 in which the error flag S is tested.

If the error flag S has the value 1, which corresponds to the situation in which the step E310 has been effected (i.e. the case of detection of an anomaly by negative verification of the checksum in the step E306), there follows the step E320 in which the anomaly previously detected is processed, for example by writing blocking (or lock) data in the rewritable memory 6.

Writing a lock in the rewritable memory 6 consists in writing certain data into that memory 6 that will prevent any subsequent use of the microcircuit card 10. For example, if the microcircuit card 10 is subsequently inserted into another user terminal, the microprocessor 2 of the microcircuit card 10 will detect the presence of the blocking data in the rewritable memory 6 and will not carry out any processing or exchange of information with the user terminal.

Writing a lock in the rewritable memory 6 constitutes a particularly effective countermeasure against a fault generation attack. This type of processing of the detected anomaly is therefore of particular interest if this anomaly stems from a fault generation attack or in situations where security must be of such a level that any operating anomaly must entail the blocking of the microcircuit card.

The countermeasure may equally consist in deleting confidential data, for example secret keys, from the rewritable memory 6.

Alternatively, the step of processing the anomaly could consist in updating a flag (stored in random access memory 4 or in rewritable memory 6) representative of the anomaly detected during the FIG. 3 method. This solution does not lead immediately to the blocking of the microcircuit card, but keeps a trace of the presence of an operating anomaly in order to analyze the problem encountered and where appropriate then to proceed to blocking the card (for example if other elements corroborate the hypothesis of a fault generation attack).

If the step E316 previously described indicates that the error flag S does not have the value 1 (i.e. that the verification of the step E306 was positive), the method continues its normal operation with the step E318, in which the address of the buffer memory area in random access memory 4 previously mentioned is sent to the output in order to enable use of the data read in the rewritable memory 6 in subsequent operation of the microcircuit card.

For example, if the method is a Read Record routine as defined by the ISO 7816 standard, the content of the buffer memory area is sent in the subsequent steps.

Figure 4:
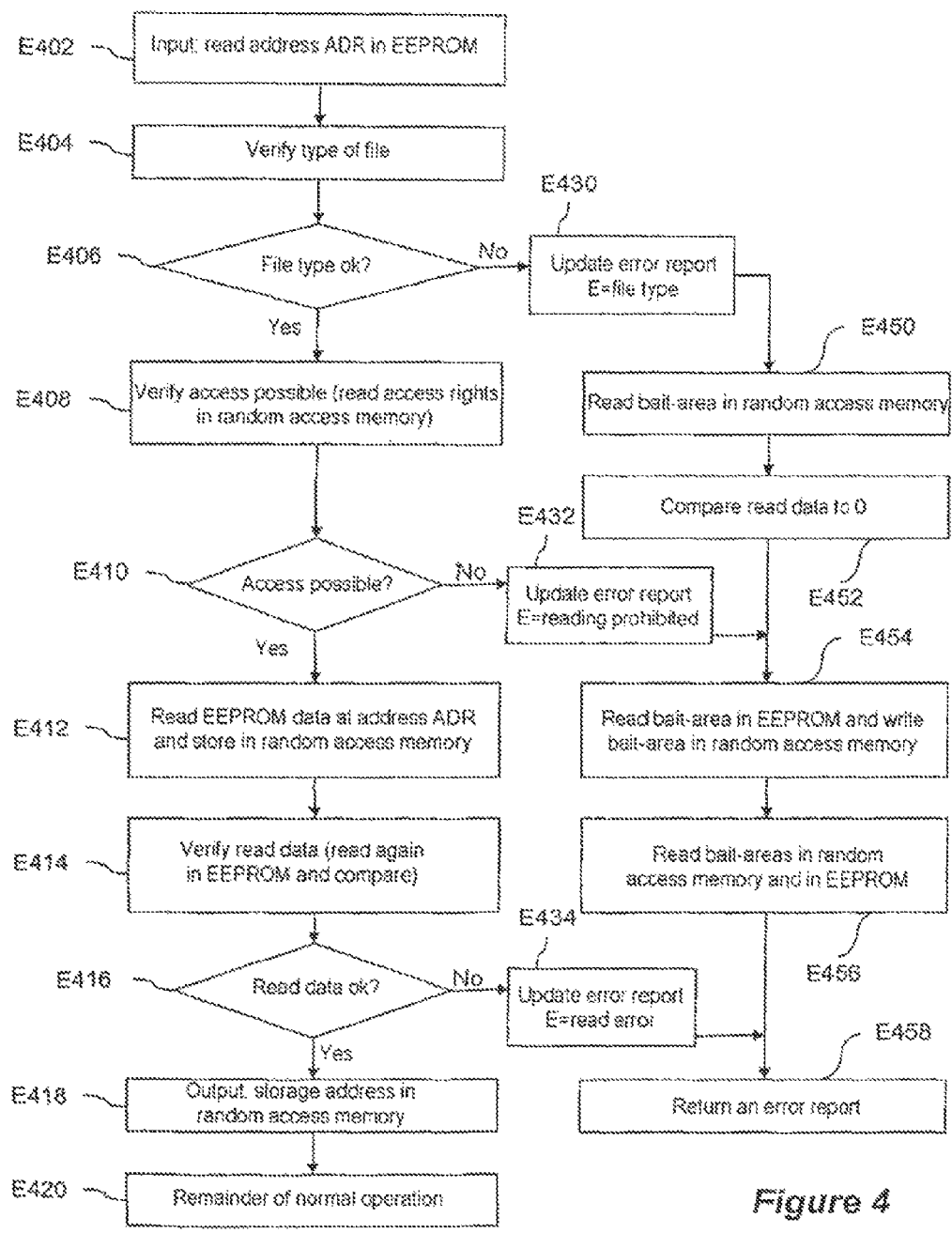
FIG. 4 represents a method implemented in accordance with a second embodiment of the invention.

FIG. 4 shows a method of reading in rewritable memory 6 carried out in accordance with a second embodiment of the invention.

This method is for example implemented by the execution of the instructions of a computer program by the microprocessor 2.

As for the method of FIG. 3, the method described here receives as input, in the step E402, the address ADR at which it must read data in the rewritable memory 6.

There then follows in the step E404 a verification of the type of file read. The step E404 may for example consist in reading in the rewritable memory 6 the header of the file designated by the address ADR and verifying that the data of that header corresponds to data indicative of the type that must be read using the method described here.

If the file type designated by the header does not correspond to the type of file that must be read, there is a departure from the normal running of the method in the step E406 to go to the step E430 described hereinafter. If on the other hand the file type is correct, the step E406 leads to the step E408 of normal operation as now described.

In the step E408, it is verified that reading in the rewritable memory 6 is authorized by comparing the necessary access rights specified in the header of the file to those presented by the user, this information being accessible in random access memory 4.

If reading in rewritable memory 6 is not authorized according to the data read in random access memory, the verification of the possibility of access to that memory 6 is negative and there then follows the step E432 described hereinafter.

On the other hand, if it is determined in the step E410 that access to the rewritable memory 6 is authorized, there follows the step E412 for the continuation of normal operation of the microcircuit card.

The steps E404 to E410 therefore proceed to verifications of the normal operation of the microcircuit card. Verifications other than those given here by way of example could naturally be carried out.

The step E412 already mentioned, which follows if the various verifications relating to normal operation have been positive, consists in reading the data stored at the address ADR in the rewritable memory 6 in order to store it in random access memory 4 to use it subsequently during data processing effected by the microprocessor 2.

This step therefore brings about repeated access in read mode to the rewritable memory 6 and repeated access in write mode to the random access memory 4.

Once the transfer of data from the rewritable memory 6 to the random access memory 4 is finished (either by reading a fixed number of bytes in rewritable memory 6 or by reading the precise number of bytes to read received for example as input in the step E402), there follows a step E414 of verifying the accuracy of the read data. To do this, for example, the data in the rewritable memory 6 is read again and that data is compared to the corresponding data previously stored in the random access memory 4 in the step E412.

If an error is detected during the comparison, the step E434 described hereinafter follows on from the step E416.

On the other hand, if all the data has been read correctly (i.e. the second reading in the rewritable memory 6 generates data identical to that read during the step E412), the step E416 leads to the continuation of normal operation in the step E418 now described.

The step E418 consists in returning as output the address at which the data read in the rewritable memory 6 is stored in random access memory in order for the latter data to be available for the continuation of the normal operation diagrammatically represented by the step E420 in FIG. 4. When it is a question of a Read Record command defined by the ISO 7816 standard, this step E420 consists for example in sending the data that has been read.

In the situation where an erroneous file type has been detected in the step E406, there follows in the manner previously indicated the step E430 of updating an error report E so that the latter indicates an error stemming from the file type.

The step E430 is followed by the step E450 in which a bait-area in random access memory 4 is read. The bait-area is for example a dedicated area, with no other use, that contains data dedicated to this use and that is different here for example from the access rights relating to the authorization to read in rewritable memory 6 mentioned in relation to the step E408.

There then follows the step E452 in which the data read in the step E450 (i.e. the data read in the bait-area which can therefore be referred to as "bait-data") is compared to the value 0.

It may be noted that the steps E450 and E452 have no functional role in the operation of the card, i.e. neither the data that is processed therein nor the result of the comparison that is effected has any impact on the other portions of the method.

Nevertheless, for an external observer such as an attacker who is measuring the current consumption of the microcircuit card, executing these two steps is not distinguished from operations carried out during the normal operation step E408 described hereinabove. In fact, the operations of the steps E408 and E410 that consisted in reading data in random access memory and comparison thereof have a signature similar to the similar operations of reading in random access memory and comparison with the value 0 effected in the steps E450 and E452.

Thus, at this stage of the method, it is impossible for an attacker to determine by means of observations conducted from the outside that an anomaly has been detected in the step E406.

The step E452 is followed by the step E454 that will be described hereinafter.

In the same line of thinking as that which has just been described with regard to the detection of an erroneous file type, there follows as already stated in the case of prohibition of access to rewritable memory (steps E408 and E410) a step E432 in which the error report E is updated to indicate that the error stems from a prohibition of reading the rewritable memory 6.

The step E432 is also followed by the step E454 already mentioned and that will now be described.

In the step E454, the method reads in a bait-area of the rewritable memory 6 and writes in a bait-area of the random access memory 4.

As indicated hereinabove, the bait-areas in the memories 4, 6 are areas of those memories in which data is written that has no particular function in normal operation. Access in read or in write mode to these bait-areas nevertheless allows simulation, for an external observer of the running of the method, the steps carried out during normal operation, for example in the step E412, without impacting on the data used elsewhere by the method or on the security thereof.

The step E454 is followed by a step E456 of reading bait-areas in the random access memory 4 and in the rewritable memory 6. As indicated hereinabove, this access in read mode has no functional role in the normal operation of the program (i.e. the data read in the bait-areas is not used in other portions of the method). However, for an attacker who is attempting to discover the internal working of the method by means of observations (for example of the electrical consumption of the microprocessor or the memories 4, 6), the steps E454 and E456 generate signatures that are respectively similar to the signatures generated by the steps E412 and E414 during normal operation.

Thus, at this stage of the method, it is impossible for an attacker, by external observation of the operation of the microcircuit card, to determine if the method is effecting the steps E412 and E414 of normal operation or the steps E454 or E456 subsequent to detection of an operating anomaly (whether that be an anomaly caused by an erroneous file type or a departure from normal operation through prohibition of access to the rewritable memory 6).

Like the steps E450 and E452, the steps E454 and E456 are not steps of processing the detected anomaly, since these steps work on bait-data, without seeking to remedy a functional error or to implement a countermeasure if the anomaly stems from a fault generation attack.

The step E456 is followed by the step E458 described hereinafter.

On the assumption mentioned hereinabove to the effect that the verification of the accuracy of the data read in the step E412 by the step E414 is negative, the step E416 is followed by the step E434 of updating the error report E in order for the latter to indicate that the error detected stems from an error in reading the rewritable memory 6.

The step E434 is then followed by the step E458 already mentioned and now described.

The step E458 consists in sending the error report as determined during a preceding step (i.e. during one of the steps E430, E432 and E434). The error code may be sent to another method (or another part-method) implemented in the microcircuit card. For example, if the method represented in FIG. 4 represents a subroutine executed if the main program managing the operation of the microcircuit card requires the rewritable memory 6 to be read, the step E458 may consist in returning the value of the error report to the main program.

Alternatively, the error report may be sent in the step E458 to the user terminal via the interface 8.

The method represented in FIG. 4 therefore has two main branches:

a first branch which corresponds to the normal running of the method (steps E402 to E420);

a second branch made up of steps at least some of which are effected after an anomaly has been detected (steps E450 to E458).

As has been seen, many steps of the first branch are simulated, in the case of detection of an anomaly, by a corresponding step of the second branch. For this purpose, the corresponding step of the second branch uses an instruction of the same type as the corresponding step of the first branch, and where necessary uses a call with a device identical to that used in the corresponding step of the first branch, to generate for an attacker the same signature, for example in terms of electrical consumption or electromagnetic radiation.

Figure 5:
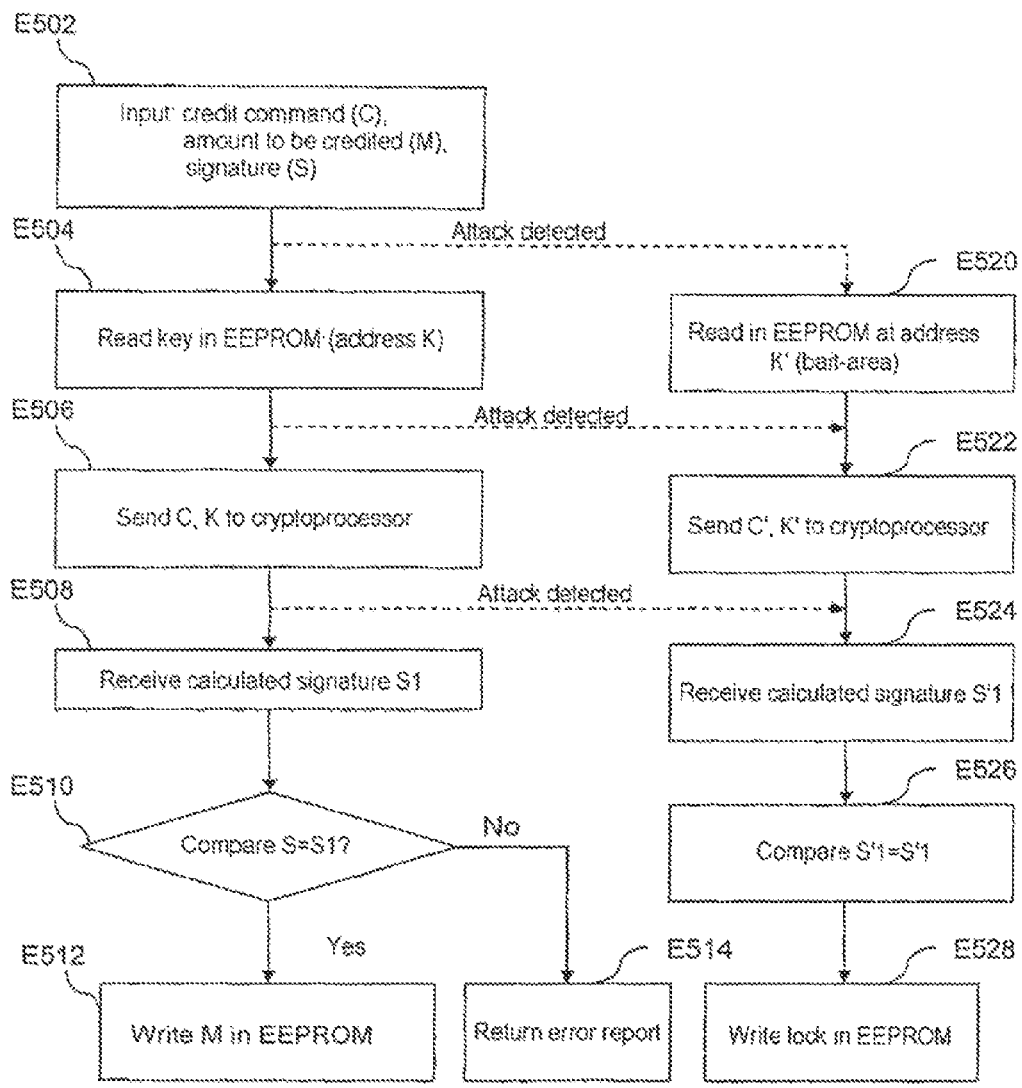
FIG. 5 represents a method implemented in accordance with a third embodiment of the invention.

FIG. 5 represents a method used in an electronic purse type microcircuit card (sometimes designated by the English word purse) according to the teachings of a third embodiment of the invention.

This method is implemented for example by the execution of a program consisting of instructions in the microprocessor 2 of the microcircuit card.

FIG. 5 represents the main steps of the method used to credit the electronic purse, i.e. to modify the data stored in the microcircuit card that represents the value of the electronic purse in the sense of an increase in that value.

This method therefore begins with the step E502, in which the microprocessor 2 of the microcircuit card 10 receives from the user (via the interface 8) a credit command code C, the amount M to be credited and a signature S, as represented in the step E502.

As will be seen hereinafter, the signature S ensures that the user actually has an authorization to effect this credit; in fact, without this precaution, anyone could command the increase in the value of the electronic purse, which is obviously unacceptable.

The steps effected during normal operation of the electronic purse crediting method are now described.

In the step E504, which follows the step E502 in normal operation, the microprocessor commands the reading in the rewritable memory 6 of a key K by specifying the storage address of this key in the rewritable memory 6. The key K stored in the rewritable memory 6 is secret and is therefore not accessible from the outside.

The microprocessor 2 then proceeds to the step E506 of sending the secret key K read in the rewritable memory 6 and the control code C to a cryptoprocessor (not shown in FIG. 1). The cryptoprocessor effects a cryptographic calculation on the basis of the data received (secret key K, command code C) using conventional cryptographic algorithms, for example the DES algorithm. More precisely, an algorithm is applied here to the control code C using the secret key K in order to obtain a calculated signal S1.

The cryptoprocessor then returns to the microprocessor 2 the calculated signature S1 (step E508).

If the user who commands the execution of the method is effectively authorized to effect the credit, he also knows the secret key K and can therefore determine the signature S in exactly the same way as the calculation that has just been effected to calculate the signature S1.

This is why in the step E the signature received from the user S is compared to the signature S1 calculated on the basis of the secret key K stored in the microcircuit card, which makes it possible to determine if writing the credit is authorized.

Accordingly, if the comparison between S and S1 is positive in the step E510, there follows the step E512 in which the amount M to be credited, or alternatively the value of the electronic purse resulting from that credit, is written in the rewritable memory 6.

On the other hand, if it is determined in the step E510 that the signature S received from the user does not correspond to the calculated signature S1, crediting the electronic purse cannot be authorized and there then follows the step E514 in which the microprocessor 2 sends the user terminal an error report.

There have just been described the main steps of a method of crediting an electronic purse. Naturally, to ensure secure working of this method, these main steps are separated by steps for verification of the normal running of the method, which by various tests detect functional errors on the one hand and attacks on the other hand, for example fault generation attacks.

In the case of detection of an attack, the microprocessor 2 carries out steps different from those of normal operation, as now described. According to a variant that may be compatible with what is described hereinafter, the method may also use these different steps (or other steps different from normal operation) if a functional error is detected (rather than an attack).

As represented in dashed line in FIG. 5, if an attack is detected between the step E502 of receiving data and the step E504 of reading the secret key K in the rewritable memory 6, there follows the step E520 in which data is read in the rewritable memory 6 at an address K' that constitutes a bait-area corresponding to the area containing the secret key K read in the step E504 during normal operation.

Accordingly, if an attacker generates a fault attack that is detected by the microprocessor 2, there follows the step E520 whereof the electrical or electromagnetic signature (as observed by the attacker) is similar to that of the step E504 effected in normal operation. The attacker therefore thinks that his attack has not been detected and that the microprocessor 2 is actually reading the secret key K in the rewritable memory 6.

After the step E520, there follows the step E522. This step E522 also follows if an attack is detected by steps of verification of the normal running of the method situated between the steps E504 and E506 previously described.

The step E522 consists in sending to the cryptoprocessor (previously mentioned with regard to the steps E506 and E508) data C' and K' that constitutes bait-data. Thus the step E522 has no particular functional role, but simulates the step E506 for an attacker who is observing the operation of the microcircuit card 10 by simply studying the electrical consumption of or the electromagnetic radiation generated by the card.

If the step E522 is preceded by the step E520, the bait-data K' may be the data read during the step E520. Alternatively, it may be predetermined data, and preferably data unrelated to the secure operation of the microcircuit card 10.

As previously, the signature of the step E522 being similar to that of the step E506 effected in normal operation, an attacker is unaware when the step E522 is executed that his attack has in fact been detected.

The step E522 is followed by the step E524 described hereinafter.

As before, the steps E506 and E508 may be separated by steps of verification of the normal operation of the method adapted to detect an attack, as represented in dashed line in FIG. 5. If an attack is detected, the method also continues at the step E524.

The step E524 consists in receiving a signature calculated by the cryptoprocessor. As previously for the steps E520 and E522, the step E524 simulates a step of normal operation (here the step E508) in order to prevent an attacker detecting that his preceding attack has been detected.

If the step E522 has previously been effected, the signature S1' is for example the signature calculated by the cryptoprocessor on the basis of the data C' and K' transmitted during the step E522. In this case, the calculated signature S1' has no functional role since it is based on bait-data.

When the method reaches the step E524 following the detection of an attack between the steps E506 and E508, the step E524 may for example consist in actually receiving only a portion of the signature calculated by the cryptoprocessor on the basis of the data C and K sent in the step E506. The rest of the signature S' is for example forced to a predetermined value, such that the result obtained (signature S1') does not correspond to the signature S1 in order to preserve the security of the operation of the microcircuit card.

The step E524 is followed by the step E526 in which there is effected for example a comparison of the value S1' that has just been determined with itself. As previously, this step has no functional role (since the result of the comparison of a number with itself is obviously known in advance), but simulates the step E510 for an attacker who is observing the electrical and/or electromagnetic behavior of the microcircuit card 10. In fact, the steps E526 and E510 using the same instruction, they have very similar electrical (and electromagnetic) signatures.

Thus, if an attack has been detected between the steps E502 and E508 of normal operation, normal operation has been interrupted (by the switch to the bait-steps E520 to E526) without this change being detectable by an attacker, however.

The step E526 is followed by the step E528 in which blocking (or lock) data is written in the rewritable memory 6.

As already mentioned with regard to the first embodiment described with reference to FIG. 3, writing blocking data in the rewritable memory 6 prevents all subsequent use of the microcircuit card 10. It is therefore a particularly severe and effective countermeasure in response to the detection of an attack.

Note further that the step E528 is executed at a time when normal operation would have executed the step E512 of writing the amount in rewritable memory 6. Thus the step E528 is initially confused by the attacker with the step E512 of normal operation that has the same electrical and/or electromagnetic signature, in particular because the steps E512 and E528 correspond to instructions of the same type that both effect a communication from the microprocessor 2 to the rewritable memory 6.

As clearly visible in FIG. 5, the step E512 and the preceding steps of normal operation each have a similar signature step executed in the case of detection of an attack. In particular, the step E512 of writing the amount in the rewritable memory 6, which constitutes an important step in the execution of the method, is associated with the step E528 of writing blocking data, which precisely constitutes the countermeasure in the case of detection of an attack against this method.

Thus not only is an attacker unable to determine the detection of his attack because of the steps E520 to E526 simulating normal operation, but the countermeasure (here the writing of blocking data) is also applied with a chronology such that it is confused with a step of normal operation having a similar electrical and/or electromagnetic signature.

The examples that have just been described are merely possible embodiments of the invention.

The invention claimed is:

1. A data processing method implemented in an electronic apparatus for securing a microcircuit card against fault generation attacks comprising the following steps performed by a microprocessor of the microcircuit card during a same execution of a computer program by the microprocessor:
   verifying a criterion indicative of normal running of the method to detect a fault generation attack on the microcircuit card;
   updating an error flag when the verifying step result is negative, thereby detecting a fault generation attack on the microcircuit card;

testing the error flag; and a processing executed when the step of testing the error flag indicates the verifying step result is negative and a fault generation attack is detected on the microcircuit card, wherein the processing step is separated from the verifying step by an intermediate step of non-null duration performed prior to testing the error flag, wherein a first action is performed when the verifying step result is positive and prior to testing the error flag, wherein the intermediate step includes performing at least one second action having a same first external signature observable by an observer external to the microcircuit card as the first action, wherein a third action is performed after testing the error flag when the verifying step result is positive and wherein the processing step includes performing at least one fourth action having a same second external signature observable by the observer external to the microcircuit card as the third action, wherein said third and fourth actions comprise writing data in a physical memory and wherein said fourth action comprises the writing of at least one of:
blocking data preventing any subsequent use of the electronic apparatus, and
data representative of a detected anomaly when the verifying step result is negative, said data representative of the detected anomaly enabling an analysis of a problem encountered by said electronic apparatus, wherein the same first external signature is a same electrical consumption signature or a same electromagnetic radiation signature of the electronic apparatus generated by the first action and by the second action and the same second external signature is a same electrical consumption signature or a same electromagnetic radiation signature of the electronic apparatus generated by the third action and by the fourth action.

2. The data processing method of claim 1, wherein the second action is performed at a time the first action would be performed when the verifying step result is positive.

3. The data processing method of claim 1, wherein the second action is different from the first action.

4. The data processing method of claim 1, wherein a number of instructions used in the first action and in the second action is the same.

5. The data processing method of claim 1, wherein the type of instruction used by the first action and by the second action is the same.

6. The data processing method of claim 1, wherein the first action includes accessing a first area of said physical memory and wherein the second action includes accessing a second area of said physical memory different from the first area.

7. The data processing method of claim 1, wherein said physical memory is a rewritable semiconductor memory.

8. The data processing method of claim 7, wherein said physical memory is in an external device.

9. The data processing method of claim 8, wherein the external device is a user terminal.

10. The data processing method of claim 1, wherein the first action is performed in a secure step.

11. The data processing method of claim 10, wherein the secure step includes a cryptographic algorithm.

12. The data processing method of claim 1, wherein the criterion is negative if an anomaly is detected.

13. The data processing method of claim 1, wherein the criterion is negative if an attack is detected.

14. The data processing method of claim 1, wherein the criterion is negative if a functional error is detected.

15. The data processing method of claim 1, implemented by a microprocessor of a microcircuit card.

16. The data processing method of claim 1, wherein the fourth action is performed at a time the third action would be performed when the verification is positive.

17. The data processing method of claim 1, wherein a number of instructions used in the third action and in the fourth action is the same.

18. The data processing method of claim 1, wherein a type of instruction used by the third action and by the fourth action is the same.

19. The data processing method of claim 1, wherein the third action includes accessing a third area of a said physical memory and wherein the fourth action includes accessing a fourth area of said physical memory different from the third area.

20. A data processing device comprising:
a microcircuit card with a microprocessor;
the microprocessor having the following means that are operative during a same execution of a computer program by the microprocessor,
means for verification of a criterion indicative of normal operation of the device to detect a fault generation attack on the microcircuit card;
means for updating an error flag when the verification is negative, thereby detecting a fault generation attack on the microcircuit card;
means for testing the error flag;
processing means activated when the means for testing the error flag indicates that the verification is negative and a fault generation attack is detected on the microcircuit card; and
separation means for separating the operation of the verification means from the operation of the processing means with an intermediate step of a non-null duration performed prior to testing the error flag,
wherein the microprocessor is configured to perform a first action prior to testing the error flag when the means for verification indicates a positive result, and wherein said separation means is configured to perform a second action having a same external signature observable by an observer external to the microcircuit card as the first action,
wherein the microprocessor is configured to perform a third action after testing the error flag when the means for verification indicates the positive result, and wherein the processing means is configured to perform a fourth action having a same second external signature observable by the observer external to the microcircuit card as the third action,
wherein said third and fourth actions write data in a physical memory and wherein said fourth action writes at least one of:
blocking data preventing any subsequent use of the device, and
data representative of a detected anomaly when the verification is negative, said data representative of the detected anomaly enabling an analysis of a problem encountered by said device,
wherein the same first external signature is a same electrical consumption signature or a same electromagnetic radiation signature of the device generated by the first action and by the second action and the same second external signature is a same electrical consumption signature or a same electromagnetic radiation signature of the device generated by the third action and by the fourth action.

* * * * *